United States Patent
So

[11] Patent Number: 6,131,535
[45] Date of Patent: Oct. 17, 2000

[54] METHOD OF CONTROLLING OPERATION OF ANIMAL TRAINING DEVICE

[76] Inventor: Ho Yun So, Kwangjang Apt. 8dong 106ho, 28 bunji, Youido-Dong, Yongdungpo-Gu, Seoul 150-010, Rep. of Korea

[21] Appl. No.: 09/233,150

[22] Filed: Jan. 19, 1999

[30] Foreign Application Priority Data

Feb. 19, 1998 [KR] Rep. of Korea .......................... 98-5232

[51] Int. Cl.[7] .......................... A01K 15/02; A01K 15/04
[52] U.S. Cl. ..................... 119/719; 119/720; 340/573.3
[58] Field of Search .................................. 119/719, 720, 119/721, 859, 908; 340/573.3, 870.09

[56] References Cited

U.S. PATENT DOCUMENTS

| | | | |
|---|---|---|---|
| 5,353,744 | 10/1994 | Custer | 119/719 |
| 5,559,498 | 9/1996 | Westrick et al. | 119/721 |
| 5,601,054 | 2/1997 | So | 119/718 |
| 5,605,116 | 2/1997 | Kim et al. | 119/720 |
| 5,666,908 | 9/1997 | So | 119/720 |
| 5,749,324 | 5/1998 | Moore | 119/719 |
| 5,769,032 | 6/1998 | Yarnall, Sr. et al. | 119/721 |
| 5,815,077 | 9/1998 | Christiansen | 119/719 |
| 5,913,284 | 6/1999 | Van Curren et al. | 119/720 |
| 6,019,066 | 2/2000 | Taylor | 119/719 |
| 6,047,664 | 4/2000 | Lyerly | 119/719 |

*Primary Examiner*—Peter M. Poon
*Assistant Examiner*—Elizabeth Shaw
*Attorney, Agent, or Firm*—Pollock, Vande Sande & Amernick, R.L.L.P.

[57] ABSTRACT

A method of controlling the operation of an animal training device which is worn around the neck of an animal to apply at least one of an impulse wave and vibration to the animal. Upon pushing a first function switch under the condition that a security code number is set by a security code setting unit, the level of the impulse wave to be applied to the animal is set by a volume adjustment unit and a mode selector is set to any one of a vibration position, vibration/impulse wave position, impulse wave position, a receiver receives a radio signal containing such data and thus applies at least one of the vibration and impulse wave to the animal to train it. Further, the volume adjustment unit employs a variable resistor which can finitely adjust the impulse wave level. Therefore, only a vibration or a low-level impulse wave can be applied to an animal over-sensitive to an electrical stimulation to readily train it.

6 Claims, 8 Drawing Sheets

METHOD OF CONTROLLING OPERATION OF ANIMAL TRAINING DEVICE

BACKGROUND OF THE INVENTION

1. Field of the Invention

The present invention relates to a method of controlling the operation of an animal training device which is worn around the neck of an animal to apply at least one of an impulse wave and vibration to the animal, so as to train the animal while applying a stimulation thereto.

2. Description of the Prior Art

In general, animal training devices are attached to the neck of an animal or a portion of the body thereof to train the animal while applying an electrical stimulation thereto.

One such conventional device is shown in U.S. Pat. No. 5,666,908, filed by this applicant on Jul. 5, 1995 and issued thereto on Sep. 16, 1997.

In the '908 patent, an animal training device comprises a transmitter 110 and a receiver 100, as shown in FIG. 1 herein.

The transmitter 110 is adapted to transmit a radio signal 112 according to an operation of a trainer training an animal to apply an electrical stimulation to the animal. To this end, the transmitter 110 comprises a stimulation adjust controller 114 for setting the level of an electrical stimulation to be generated by the receiver 100, in a radio signal 112 to be transmitted, a power switch 116 for controlling transmission of the radio signal 112, and a transmitting antenna 118 for transmitting the radio signal 112 therethrough. The transmitted radio signal 112 contains information regarding an indication of the stimulation level set by the stimulation adjust controller 114 and information regarding a security code for identifying a corresponding receiver 100.

The receiver 100 is adapted to receive the radio signal 112 transmitted through the transmitting antenna 118 of the transmitter 110 and generate the electrical stimulation of the level set by the stimulation adjust controller 114 of the transmitter 110 for a period of radio transmission time. To this end, the receiver 100 comprises a receiving antenna 212 for receiving the radio signal 112 transmitted through the transmitting antenna 118 of the transmitter 110, a receiver unit 130 for performing amplification and detection operations with respect to the radio signal 112 received through the receiving antenna 212 to generate the electrical stimulation of the level set by the stimulation adjust controller 114 of the transmitter 110, and a pair of electrodes 132 fixedly mounted on the inner surface of a collar 120 for applying the electrical stimulation generated by the receiver unit 130 to the animal.

The receiver unit 130 includes detection means for demodulating the radio signal 112 received through the receiving antenna 212, to detect, therefrom, information regarding the security code and the stimulation level set by the stimulation adjust controller 114 of the transmitter 110, a reception microprocessor for checking whether an output signal from the detection means is that intended by the trainer and outputting a stimulation control signal corresponding to the stimulation level set by the stimulation adjust controller 114 of the transmitter 110 if the output signal from the detection means is that intended by the trainer, amplification means switched in response to the stimulation control signal from the reception microprocessor to perform an amplification operation, and stimulation generation means for generating a high voltage according to the amplification operation of the amplification means and applying the generated high voltage as the electrical stimulation to the animal through the electrodes 132.

However, the above-mentioned conventional animal training device has a disadvantage in that the stimulation adjust controller 114 of the transmitter 110 cannot, finitely by steps, set the level of the electrical stimulation to be outputted by the receiver 100, because it is provided with a mechanical, selector switch.

Further, because only the electrical stimulation of the level set by the stimulation adjust controller 114 is generated by the receiver 100, it is difficult to train animals over-sensitive to the electrical stimulation.

SUMMARY OF THE INVENTION

Therefore, the present invention has been made in view of the above problem, and it is an object of the present invention to provide a method of controlling the operation of an animal training device which is attached to an animal to apply at least one of a high-voltage impulse wave and vibration to the animal, so as to train the animal while applying a stimulation thereto.

It is another object of the present invention to provide a method of controlling the operation of an animal training device which is capable of applying only a vibration or a low-level impulse wave to an animal over-sensitive to an electrical stimulation to readily train it.

In accordance with the present invention, the above and other objects can be accomplished by a provision of a method of controlling the operation of an animal training device which has a transmitter for transmitting a command of a trainer training an animal, in the form of a radio signal, through a transmitting antenna under control of a transmission microprocessor, and a receiver worn around the neck of the animal via a collar for receiving the radio signal transmitted by the transmitter through a receiving antenna and applying at least one of an impulse wave and vibration to the animal under control of a reception microprocessor, comprising the first step of performing an arithmetic operation with respect to security code number data from a security code setting unit of the transmitter, impulse wave level data from a volume adjustment unit of the transmitter and mode data from a mode selector of the transmitter in response to an output signal from a first or second function switch of the transmitter, generating a control signal containing the security code number data, impulse wave level data and mode data, as a result of the arithmetic operation, modulating the generated control signal at a carrier wave and amplifying the modulated signal to a radio frequency level to transmit the radio signal through the transmitting antenna; the second step of checking whether a power switch of the receiver has been pushed for a predetermined time period, receiving the radio signal transmitted at the first step through the receiving antenna if the power switch has been pushed for the predetermined time period, amplifying the received radio signal, filtering the amplified signal to remove a noise component therefrom and demodulating the filtered signal to detect the control signal therefrom; the third step of checking whether the security code number data contained in the control signal detected at the second step is the same as pre-stored security code number data; the fourth step of determining which one of a vibration position, vibration/impulse wave position and impulse wave position has been selected by the mode selector, if the security code number data in the control signal is the same as the pre-stored security code number data at the third step and if the first function switch has been turned on; and the fifth step of generating a vibration control signal and an impulse wave control signal if the vibration/ impulse wave position has been selected by the mode selector at the fourth step, supplying the generated vibration control signal to a motor driver of the receiver to drive a vibration motor of the receiver so as to apply the vibration to the animal and supplying the generated impulse wave control signal to a digital/analog converter of the receiver to drive a high voltage generator of the receiver so as to apply the impulse wave to the animal.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

The embodiment of the present invention will now be described in detail with reference to the accompanying drawings.

Figure 1:
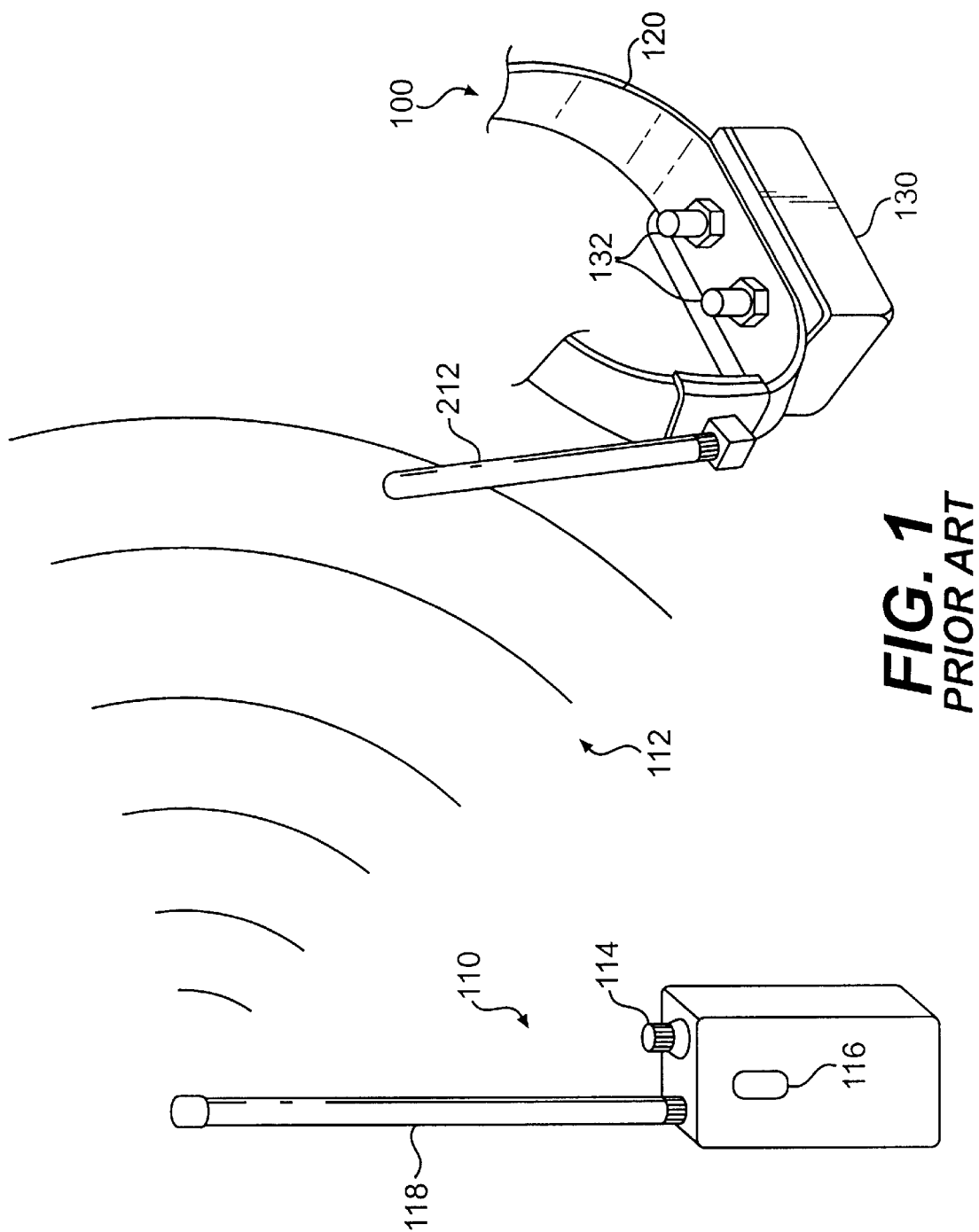
FIG. 1 is a perspective view of a conventional animal training device.
Figure 2:
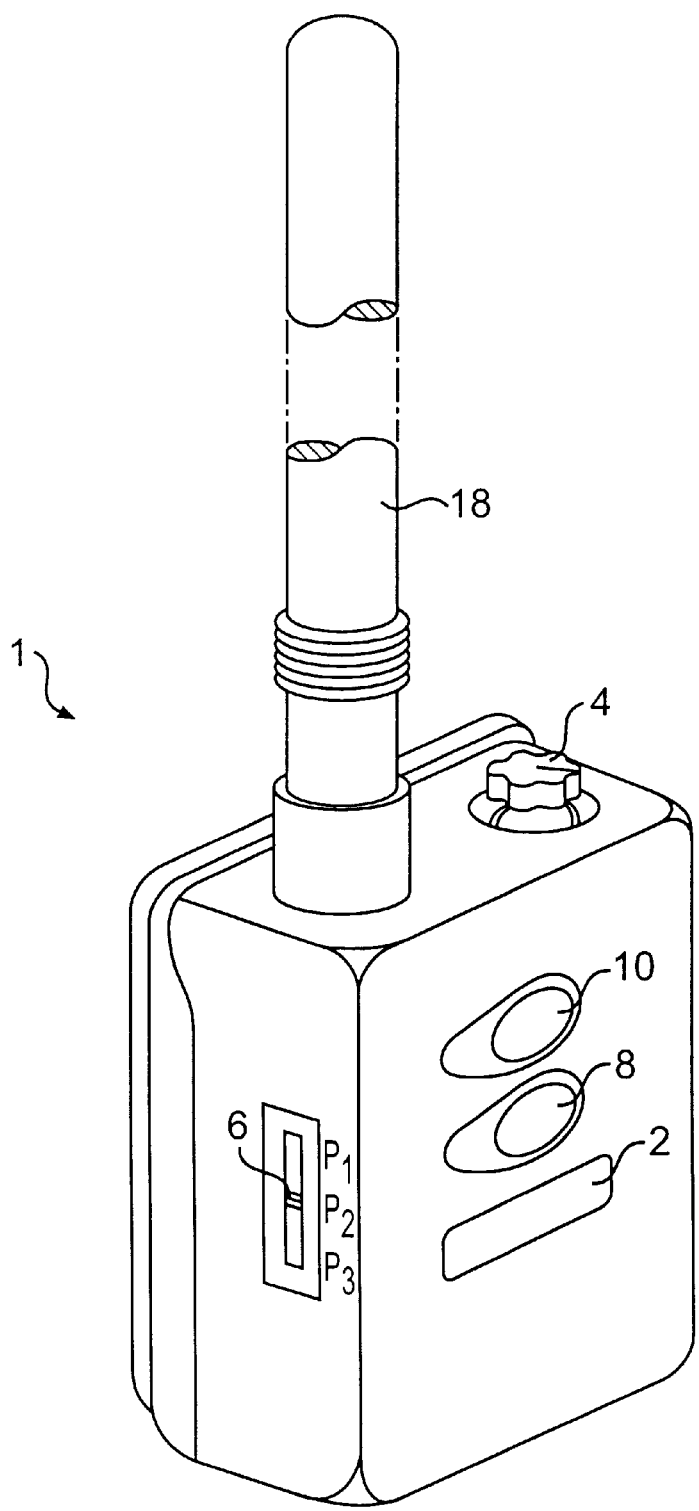
FIG. 2 is a perspective view of a transmitter in an animal training device in accordance with an embodiment of the present invention.
Figure 3:
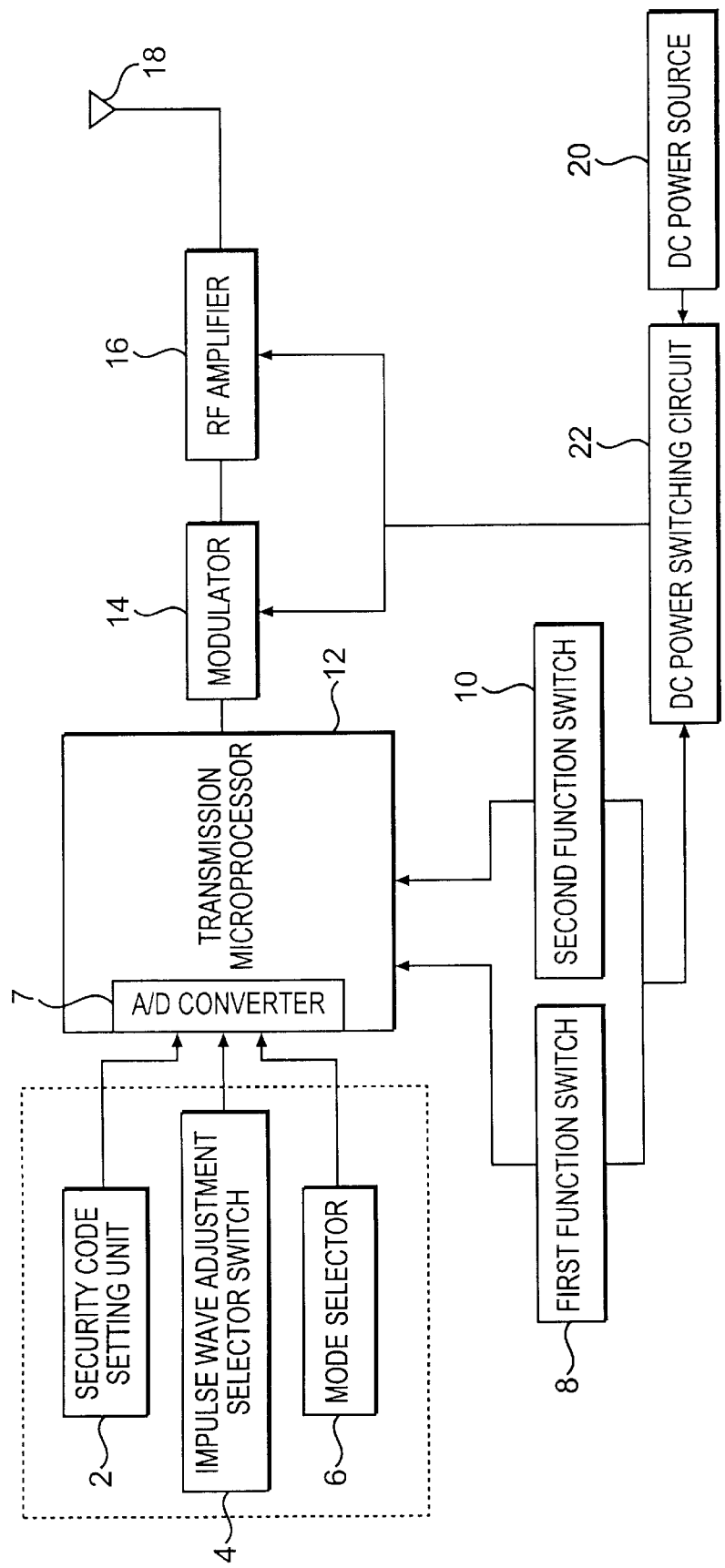
FIG. 3 is a functional block diagram of the transmitter in FIG. 2.
Figure 4:
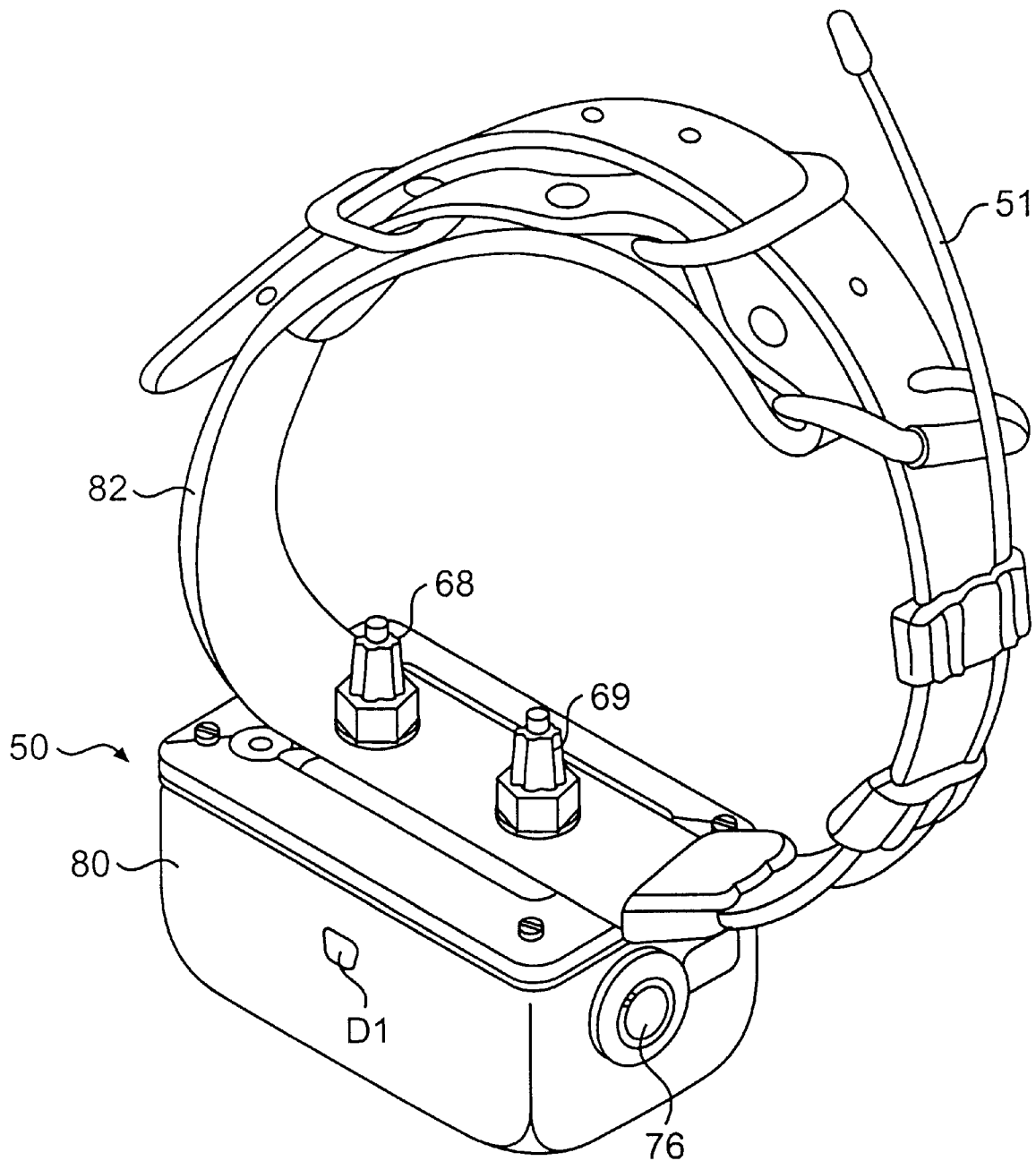
FIG. 4 is a perspective view of a receiver in the animal training device in accordance with the embodiment of the present invention.
Figure 5:
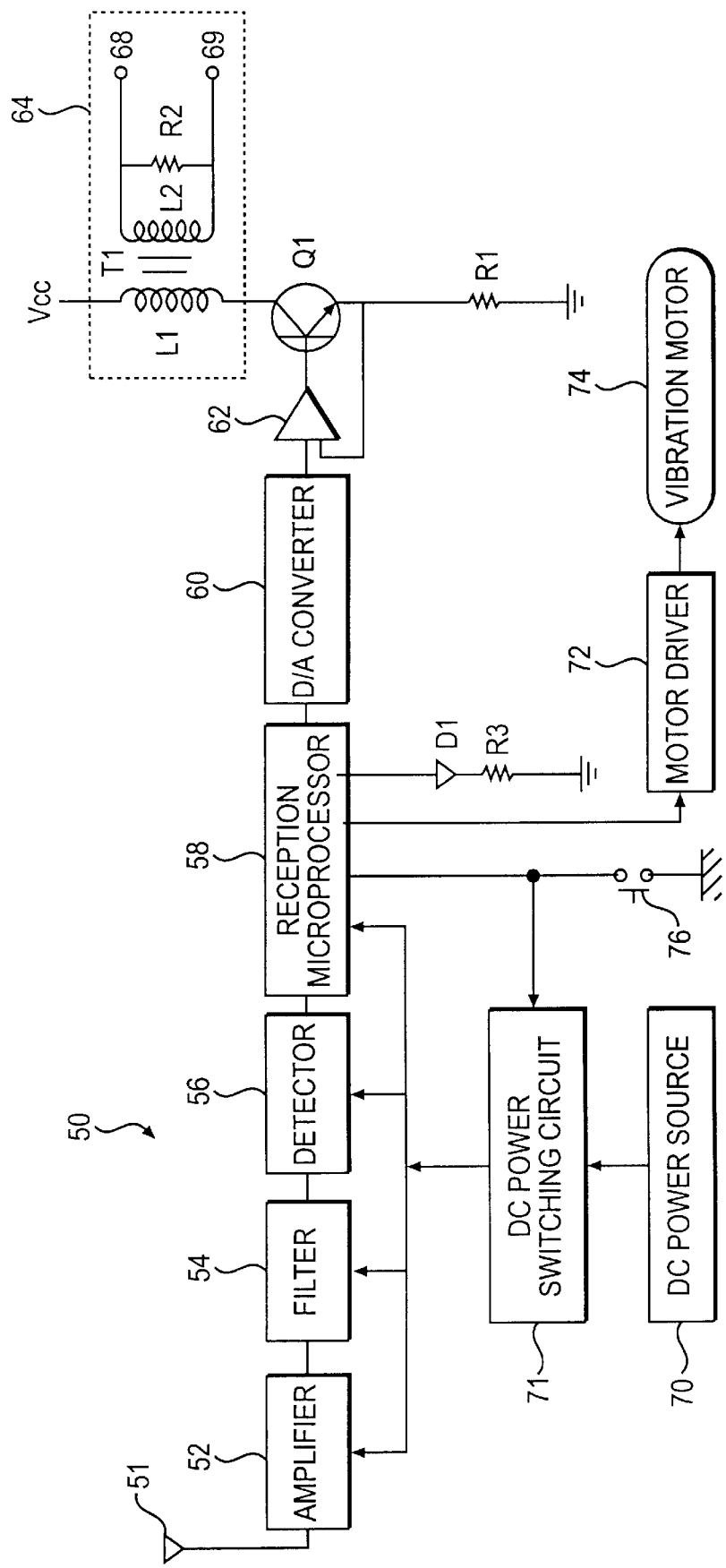
FIG. 5 is a functional block diagram of the receiver in FIG. 4.

FIG. 2 is a perspective view of a transmitter in an animal training device in accordance with an embodiment of the present invention, FIG. 3 is a functional block diagram of the transmitter in FIG. 2, FIG. 4 is a perspective view of a receiver in the animal training device in accordance with the embodiment of the present invention, and FIG. 5 is a functional block diagram of the receiver in FIG. 4.

As shown in FIGS. 2 and 4, the animal training device comprises a transmitter 1 for transmitting a command of a trainer training an animal, in the form of a radio signal, through a transmitting antenna 18, and a receiver 50 mounted on an animal's collar 82 for receiving the radio signal transmitted by the transmitter 1 through a receiving antenna 51 and applying at least one of an impulse wave of a desired level and a vibration to the animal.

As shown in FIGS. 2 and 3, the transmitter 1 comprises a security code setting unit 2 for setting a security code number, a volume adjustment unit 4 for setting the level of the impulse wave to be applied to the animal, an analog/ digital (A/D) converter 7 for converting the impulse wave level set by the volume adjustment unit 4 into a digital signal, and a mode selector 6 for selecting any one of vibration, vibration/impulse wave and impulse wave modes to allow the receiver 50 to apply at least one of the impulse wave of the level set by the volume adjustment unit 4 and the vibration to the animal.

The transmitter 1 further comprises a first function switch 8 for setting the receiver 50 to output at least one of the impulse wave and vibration in the mode selected by the mode selector 6 for a period of radio transmission time, and a second function switch 10 for setting the receiver 50 to output only the impulse wave for a period of predetermined time (for example, 0.4 sec). A transmission microprocessor 12 is provided to perform an arithmetic operation with respect to security code number data from the security code setting unit 2, impulse wave level data from the A/D converter 7 and mode data from the mode selector 6 in response to an output signal from the first or second function switch 8 or 10 and output a control signal containing the security code number data, impulse wave level data and mode data, as a result of the arithmetic operation. A modulator 14 is provided to modulate the control signal from the transmission microprocessor 12 at a carrier wave. A radio frequency (RF) amplifier 16 is provided to amplify an output signal from the modulator 14 to an RF level to generate the radio signal to be transmitted to the receiver 50. The transmitting antenna 18 is adapted to transmit the radio signal generated by the RF amplifier 16 therethrough. A direct current (DC) power switching circuit 22 is provided to supply DC power from a DC power source 20 as operating power to the transmission microprocessor 12, modulator 14 and RF amplifier 16 in response to the output signal from the first or second function switch 8 or 10.

Preferably, the A/D converter 7 is disposed in the transmission microprocessor 7 to convert the impulse wave level set by the volume adjustment unit 4 into a digital signal. Alternatively, the A/D converter 7 may be disposed between the volume adjustment unit 4 and the transmission microprocessor 12 to convert the impulse wave level set by the volume adjustment unit 4 into a digital signal and output the converted digital signal to the transmission microprocessor 12. The transmission microprocessor 12 converts the digital signal from the A/D converter 7 into a pulse signal with a pulse width PW proportioned to the impulse wave level set by the volume adjustment unit 4 and then outputs the resultant pulse signal to the modulator 14.

Further, preferably, the volume adjustment unit 4 employs a variable resistor for varying a pulse width of the impulse wave to apply an appropriate amount of electrical stimulation to the animal to be trained.

As shown in FIGS. 4 and 5, the receiver 50 comprises the receiving antenna 51 for receiving the radio signal transmitted through the transmitting antenna 18 of the transmitter 1, an amplifier 52 for amplifying the radio signal received by the receiving antenna 51, a filter 54 for filtering an output signal from the amplifier 52 to remove a noise component therefrom, and a detector 56 for demodulating an output signal from the filter 54 to detect the control signal from the transmission microprocessor 12 of the transmitter 1 therefrom. A reception microprocessor 58 is provided to receive the control signal detected by the detector 56, check whether the security code number data contained in the received control signal is the same as pre-stored security code number data and generate at least one of a vibration control signal and impulse wave control signal in response to the impulse wave level data and mode data contained in the received control signal if the security code number data in the received control signal is the same as the pre-stored security code number data. A digital/analog (D/A) converter 60 is provided to convert the impulse wave control signal from the reception microprocessor 58 into an analog signal. A buffer 62 is provided to amplify an output signal from the D/A converter 60 to a predetermined level.

The receiver 50 further comprises a transistor Q1 turned on in response to an output signal from the buffer 62, a high voltage generator 64 connected to a collector terminal of the transistor Q1 for transforming a low voltage Vcc from a Vcc voltage terminal into a high voltage and applying the transformed high voltage as the impulse wave to the animal through a pair of electrodes 68 and 69, and a motor driver 72 for driving a vibration motor 74 in response to the vibration control signal from the reception microprocessor 58 to apply the vibration to the animal.

A light emitting diode D1 is connected at its anode to the reception microprocessor 58 to indicate that the impulse wave control signal from the reception microprocessor 58 is applied to the buffer 62. The light emitting diode D1 is also connected at its cathode to a ground voltage source through a resistor R3.

The transistor Q1 has an emitter terminal connected to one side of a resistor R1, the other side of which is connected to the ground voltage source. This construction enables the high voltage generator 64 to stably generate the impulse wave regardless of an ambient temperature.

A power switch 76 is installed on a case 80 of the receiver 50 to operate a DC power switching circuit 71 to supply DC power from a DC power source 70 as operating power to the amplifier 52, filter 54, detector 56 and reception microprocessor 58. The light emitting diode D1 is installed on a side wall of the case 80 to indicate that the high-voltage impulse wave generated by the high voltage generator 64 is applied to the animal.

Preferably, the security code setting unit 2 is an electrically erasable and programmable read only memory (EEPROM) or dip switch. The high voltage generator 64 includes a transformer T1 with primary and secondary coils L1 and L2. The primary coil L1 of the transformer T1 has its one side connected to the Vcc voltage terminal and its other side connected to the collector terminal of the transistor Q1. The secondary coil L2 of the transformer T1 is adapted to boost a voltage across the primary coil L1 to a predetermined level. The electrodes 68 and 69 are connected respectively to both sides of an output resistor R2 which is, in turn, connected in parallel to the secondary coil L2 of the transformer T1.

As mentioned above, the volume adjustment unit 4 employs a variable resistor for varying its resistance to adjust the impulse wave level.

The emitter terminal of the transistor Q1 is also feedback-connected to an input terminal of the buffer 62, to allow the high voltage generator 64 to stably generate the impulse wave regardless of an ambient temperature.

The operation of the animal training device with the above-mentioned construction in accordance with the embodiment of the present invention will hereinafter be described in detail with reference to FIG. 7.

Figure 7:
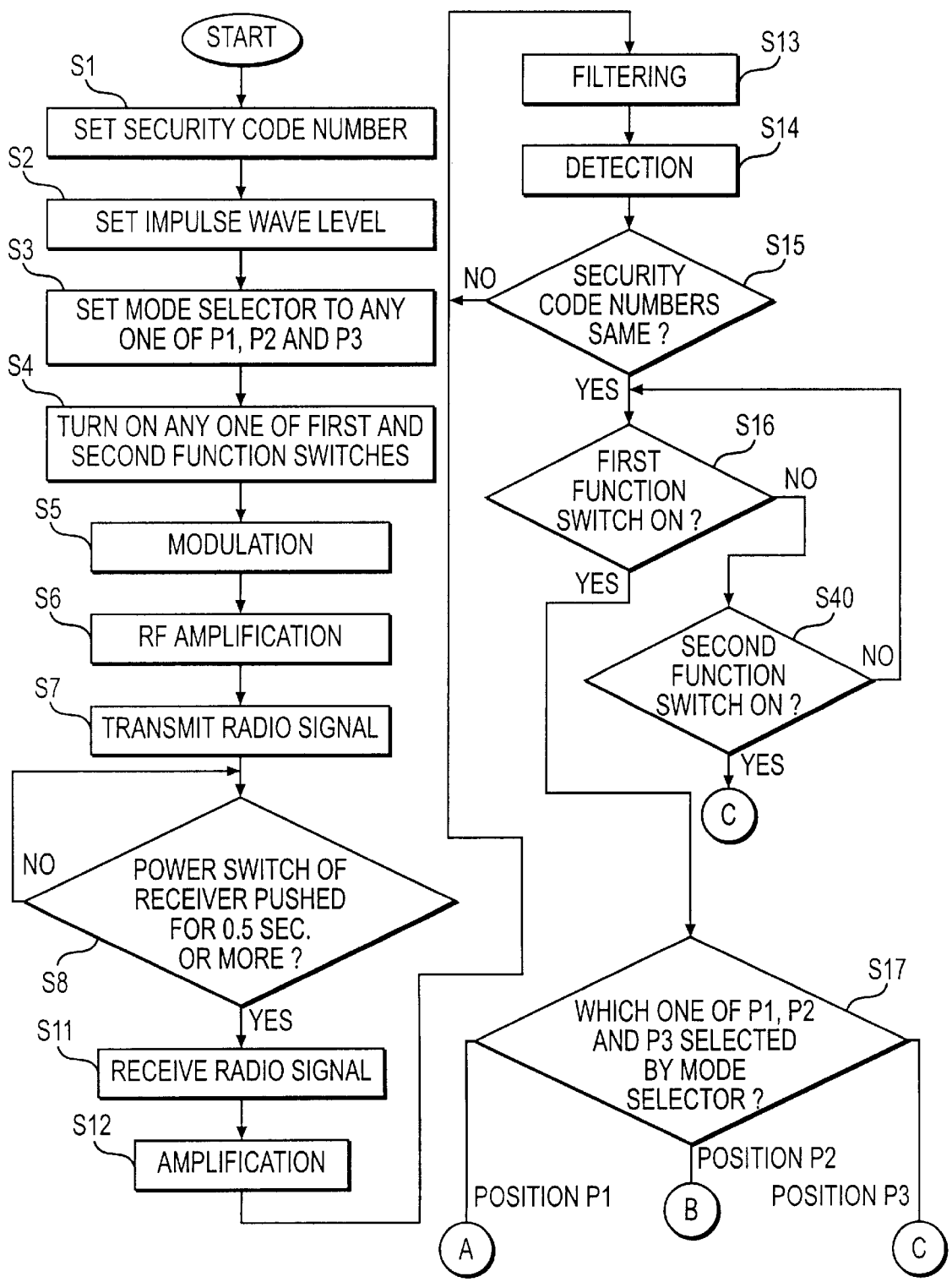
FIG. 7 is a flowchart illustrating the operation of the animal training device in accordance with the embodiment of the present invention.
Figure 7:
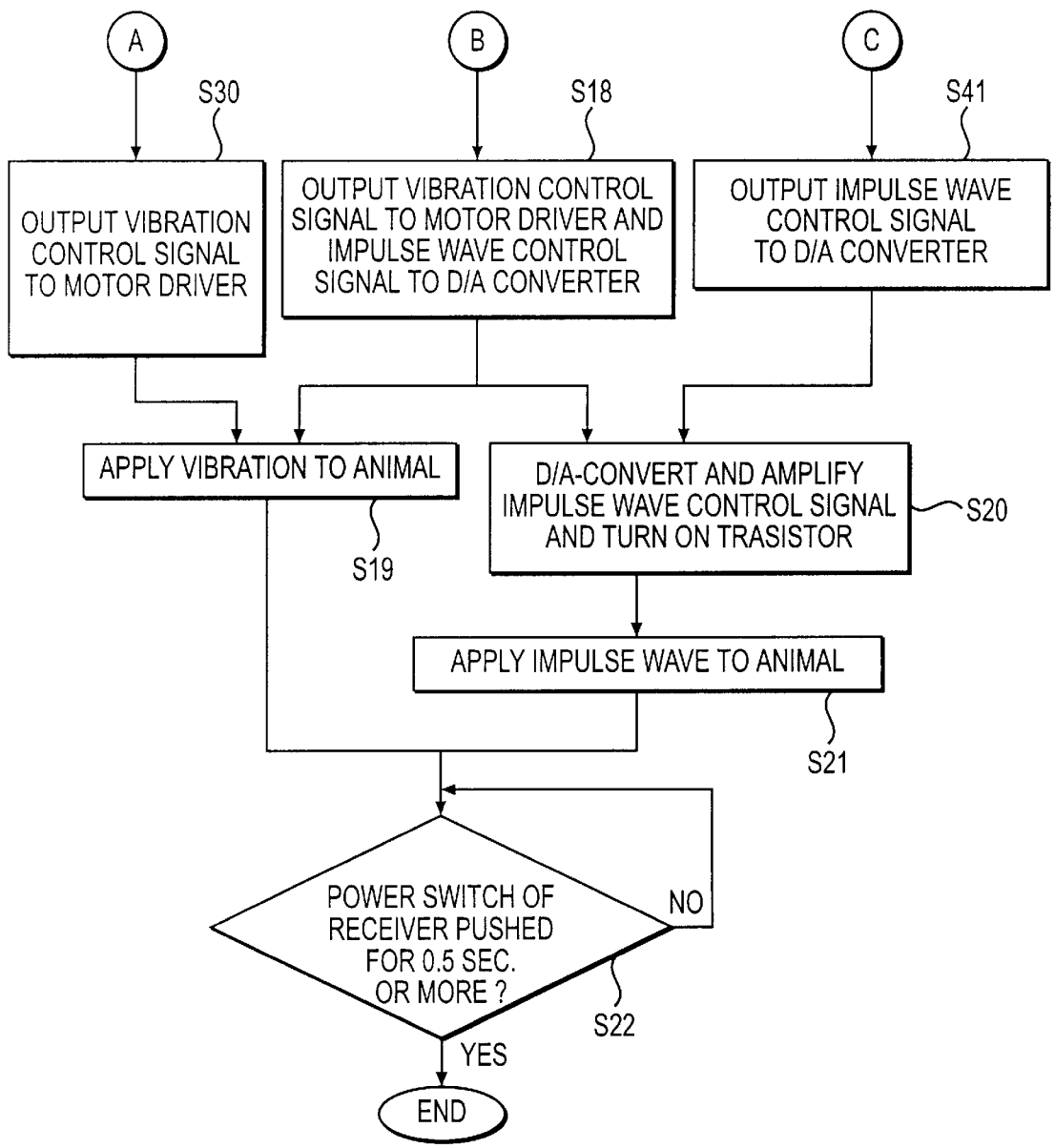

FIG. 7 is a flowchart illustrating the operation of the animal training device in accordance with the embodiment of the present invention, in which the reference character "S" denotes "step".

First, a security code number is set by the security code setting unit 2 at step S1 and the level of an impulse wave to be applied to the animal is set by the volume adjustment unit 4 at step S2. Then, the mode selector 6 is set to any one of a vibration position P1, vibration/impulse wave position P2 and impulse wave position P3 at step S3.

At this time, the impulse wave level set by the volume adjustment unit 4 is converted into a digital signal by the A/D converter 7.

Upon pushing any one of the first and second function switches 8 and 10 at step S4, the transmission microprocessor 12 receives security code number data from the security code setting unit 2, impulse wave level data from the A/D converter 7 and mode data from the mode selector 6 in response to an output signal from the first function switch 8. Then, the transmission microprocessor 12 performs an arithmetic operation with respect to the received data and outputs a control signal as a result of the arithmetic operation to the modulator 14. At this time, the control signal from the transmission microprocessor 12 contains the security code number data, impulse wave level data and mode data.

The modulator 14 modulates the control signal (containing the security code number data, impulse wave level data and mode data) from the transmission microprocessor 12 at a carrier wave at step S5. The RF amplifier 16 amplifies an output signal from the modulator 14 to an RF level at step S6 and transmits the resultant radio signal through the transmitting antenna 18 at step S7.

Figure 6:
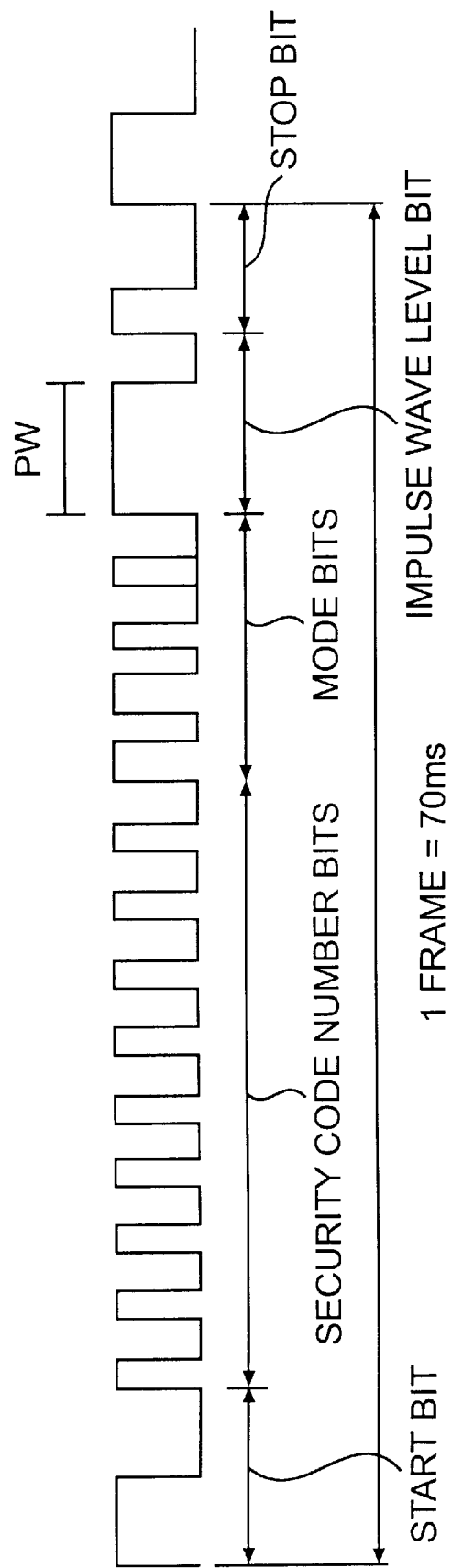
FIG. 6 is a waveform diagram of a control signal provided by a transmission microprocessor in the transmitter in FIG. 3.

As shown in FIG. 6, the control signal modulated by the modulator 14 is a one-frame (70ms) signal containing a start bit, security code number bits, mode bits, an impulse wave level bit and a stop bit. The impulse wave level bit has a pulse width PW which can be varied by the volume adjustment unit 4.

Then, the reception microprocessor 58 checks at step S8 whether the power switch 76 of the receiver 50 has been pushed for 0.5 sec or more. If the power switch 76 has been pushed for 0.5 sec or more, namely, if YES at step S8, the radio signal transmitted through the transmitting antenna 18 of the transmitter 1 is received by the receiving antenna 51 of the receiver 50 at step S13 and amplified by the amplifier 52 at step S12. Then, the filter 54 filters an output signal from the amplifier 52 at step S13 to remove a noise component therefrom. The detector 56 demodulates an output signal from the filter 54 at step S14 to detect the control signal from the transmission microprocessor 12 of the transmitter 1 therefrom. Then, the control signal detected by the detector 56 is fed to the reception microprocessor 58.

The reception microprocessor 58 checks at step S15 whether the security code number data contained in the received control signal is the same as pre-stored security code number data. If the security code number data in the received control signal is the same as the pre-stored security code number data, namely, if YES at step S15, the reception microprocessor 58 checks at step S16 whether the first function switch 8 of the transmitter 1 has been turned on.

If the first function switch 8 of the transmitter 1 has been turned on, namely, if YES at step S16, the reception microprocessor 58 determines at step S17 which one of the vibration position P1, vibration/impulse wave position P2 and impulse wave position P3 has been selected by the mode selector 6. On the other hand, the output signal from the first function switch 8 is also applied to the DC power switching circuit 22, which then supplies the DC power from the DC power source 20 as operating power to the transmission microprocessor 12, modulator 14 and RF amplifier 16.

In the case where the vibration/impulse wave position P2 has been selected by the mode selector 6 at step S17, the reception microprocessor 58 outputs a vibration control signal to the motor driver 72 and an impulse wave control signal to the D/A converter 60, respectively, at step S18. The motor driver 72 drives the vibration motor 74 in response to the vibration control signal from the reception microprocessor 58 at step S19 to apply a vibration to the animal.

At step S20, the impulse wave control signal from the reception microprocessor 58 is D/A-converted by the D/A converter 60, amplified to a predetermined level by the buffer 62 and applied as a bias voltage to a base terminal of the transistor Q1 to turn on the transistor Q1.

At step S21, as the transistor Q1 is turned on, current from the Vcc voltage terminal flows through the primary coil L1 of the transformer T1 in the high voltage generator 64, transistor Q1 and resistor R1, thereby causing a high-voltage impulse wave to be generated in the secondary coil L2 of the transformer T1. Then, the generated impulse wave is outputted at the electrodes 68 and 69 through the output resistor R2. At this time, the light emitting diode D1 connected to the reception microprocessor 58 is turned on to indicate that the high-voltage impulse wave is outputted at the electrodes 68 and 69 of the high voltage generator 64. As a result, the trainer can train the animal while applying both the impulse wave and vibration thereto.

In the disclosed embodiment, the volume adjustment unit 4 employs a variable resistor for finitely adjusting the level of the high-voltage impulse wave to be generated by the high voltage generator 64.

Then, the reception microprocessor 58 checks at step S22 whether the power switch 76 of the receiver 50 has been pushed for 0.5 or more. If the power switch 76 has been pushed for 0.5 sec or more, namely, if YES at step S22, the DC power switching circuit 71 blocks the supply of the DC power from the DC power source 70 so that the receiver 50 cannot be operated. Preferably, the receiver 50 is turned on/off only when the power switch 76 is pushed for 0.5 or more.

On the other hand, if the security code number data in the received control signal is not the same as the pre-stored security code number data, namely, if NO at the above step S15, the operation returns to the above step S11 to repeat it and the subsequent steps. In the case where the vibration position P1 has been selected by the mode selector 6 at the above step S17, the reception microprocessor 58 outputs the vibration control signal to the motor driver 72 at step S30. Then, the motor driver 72 drives the vibration motor 74 in response to the vibration control signal from the reception microprocessor 58 at the above step S19 to apply the vibration to the animal. As a result, the trainer can train the animal while applying only the vibration thereto.

In the case where the first function switch 8 of the transmitter 1 has not been turned on, namely, if NO at the above step S16, the reception microprocessor 58 checks at step S40 whether the second function switch 10 of the transmitter 1 has been turned on. If the second function switch 10 of the transmitter 1 has not been turned on, namely, if NO at step S40, the operation returns to the above step S16 to repeat it and the subsequent steps.

If the second function switch 10 of the transmitter 1 has been turned on, namely, if YES at the above step S40 or if the impulse wave position P3 has been selected by the mode selector 6 at the above step S17, the reception microprocessor 58 outputs the impulse wave control signal to the D/A converter 60 at step S41. Then, at step S20, the impulse wave control signal from the reception microprocessor 58 is D/A converted by the D/A converter 60, amplified to a predetermined level by the buffer 62 and applied as a bias voltage to the base terminal of the transistor Q1 to turn on the transistor Q1. On the other hand, the output signal from the second function switch 10 is also applied to the DC power switching circuit 22, which then supplies the DC power from the DC power source 20 as operating power to the transmission microprocessor 12, modulator 14 and RF amplifier 16.

Then, at step S21, with the transistor Q1 turned on, current from the Vcc voltage terminal flows through the primary coil L1 of the transformer T1 in the high voltage generator 64, transistor Q1 and resistor R1, thereby causing a high-voltage impulse wave to be generated in the secondary coil L2 of the transformer T1. Then, the generated impulse wave is outputted at the electrodes 68 and 69 through the output resistor R2. As a result, the trainer can train the animal while applying only the impulse wave thereto.

Then, the operation proceeds to the above step S22 to repeat it and the subsequent steps.

As stated previously, the volume adjustment unit 4 employing the variable resistor can finitely adjust the impulse wave level. This enables only a vibration or a low-level impulse wave to be applied to an animal oversensitive to an electrical stimulation to readily train it.

In the disclosed embodiment, if the security code number data in the radio signal received at the receiving antenna 51 of the receiver 50 is not the same as the security code number data pre-stored in the reception microprocessor 58, the receiver 50 is not operated.

Further, in the case where the first function switch 8 is pushed under the condition that a security code number is set by the security code setting unit 2, the level of an impulse wave to be applied to the animal is set by the volume adjustment unit 4 and the mode selector 6 is set to any one of the vibration position P1, vibration/impulse wave position P2 and impulse wave position P3, at least one of the vibration and impulse wave is applied to the animal for a period of radio transmission time to train it.

In the case where the second function switch 10 is pushed, the impulse wave from the electrodes 68 and 69 is applied to the animal for the predetermined time period (for example, 0.4 sec) to train it. Noticeably, the predetermined time period can be varied by changing a resistance or capacitance of a time constant setting circuit of the reception microprocessor 58, not shown.

As apparent from the above description, according to the present invention, in the case where the first function switch is pushed under the condition that a security code number is set by the security code setting unit, the level of an impulse wave to be applied to the animal is set by the volume adjustment unit and the mode selector is set to any one of the vibration position, vibration/impulse wave position, impulse wave position, the receiver receives a radio signal containing such data and thus applies at least one of the vibration and impulse wave to the animal to train it.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of controlling the operation of an animal training device which has a transmitter for transmitting a command of a trainer training an animal, in the form of a radio signal, through a transmitting antenna under control of a transmission microprocessor, and a receiver worn around the neck of the animal via a collar for receiving said radio signal transmitted by said transmitter through a receiving antenna and applying at least one of an impulse wave and vibration to the animal under control of a reception microprocessor, comprising the steps of:

(a) performing an arithmetic operation with respect to security code number data from a security code setting unit of said transmitter, impulse wave level data from a volume adjustment unit of said transmitter and mode data from a mode selector of said transmitter in response to an output signal from a first or second function switch of said transmitter, generating a control signal containing said security code number data, impulse wave level data and mode data, as a result of the arithmetic operation, modulating the generated control signal at a carrier wave and amplifying the modulated signal to a radio frequency level to transmit said radio signal through said transmitting antenna;

(b) checking whether a power switch of said receiver has been pushed for a predetermined time period, receiving said radio signal transmitted at said step (a) through said receiving antenna if said power switch has been pushed for said predetermined time period, amplifying the received radio signal, filtering the amplified signal to remove a noise component therefrom and demodulating the filtered signal to detect said control signal therefrom;

(c) checking whether said security code number data contained in said control signal detected at said step (b) is the same as pre-stored security code number data;

(d) determining which one of a vibration position, vibration/impulse wave position and impulse wave position has been selected by said mode selector, if said security code number data in said control signal is the same as said pre-stored security code number data at said step (c) and if said first function switch has been turned on; and (e) generating a vibration control signal and an impulse wave control signal if said vibration/impulse wave position has been selected by said mode selector at said step (d), supplying the generated vibration control signal to a motor driver of said receiver to drive a vibration motor of said receiver so as to apply said vibration to the animal and supplying the generated impulse wave control signal to a digital/analog converter of said receiver to drive a high voltage generator of said receiver so as to apply said impulse wave to the animal.

2. A method of controlling the operation of an animal training device, as set forth in claim 1, wherein said step (e) includes the step of generating only said vibration control signal if said vibration position has been selected by said mode selector at said step (d) and supplying the generated vibration control signal to said motor driver to drive said vibration motor so as to apply said vibration to the animal.

3. A method of controlling the operation of an animal training device, as set forth in claim 2, wherein said step (e) further includes the step of generating only said impulse wave control signal if said impulse wave position has been selected by said mode selector at said step (d) or if said second function switch has been turned on and supplying the generated impulse wave control signal to said digital/analog converter to drive said high voltage generator so as to apply said impulse wave to the animal.

4. A method of controlling the operation of an animal training device, as set forth in claim 1, wherein said receiver is turned on/off only when said power switch is pushed for said predetermined time period.

5. A method of controlling the operation of an animal training device, as set forth in claim 1, wherein said volume adjustment unit is a variable resistor.

6. A method of controlling the operation of an animal training device, as set forth in claim 1, wherein said step (a) includes the step of, under the control of said transmission microprocessor, converting said impulse wave level data from said volume adjustment unit into a pulse signal with a pulse width proportioned thereto and transmitting the resultant pulse signal.

* * * * *